United States Patent [19]
Hale

[11] 3,800,926
[45] Apr. 2, 1974

[54] IPTO SPEED LIMITING CONTROL VALVE
[75] Inventor: Richard A. Hale, Downers Grove, Ill.
[73] Assignee: International Harvester Co., Chicago, Ill.
[22] Filed: Jan. 8, 1973
[21] Appl. No.: 321,908

[52] U.S. Cl............... 192/.084, 192/.096, 192/.098
[51] Int. Cl............................................ B60k 25/00
[58] Field of Search................ 192/.084, .096, .098; 74/858, 872, 873

[56] References Cited
UNITED STATES PATENTS
3,605,962  9/1971  Maynard...................... 192/.096 X
2,505,447  4/1950  Wemp........................... 192/.084
2,115,125  4/1938  Sinclair.......................... 192/.096

FOREIGN PATENTS OR APPLICATIONS
640,599  7/1950  Great Britain..................... 192/.084

Primary Examiner—Samuel Scott
Assistant Examiner—Lance W. Chandler
Attorney, Agent, or Firm—John A. Schaerli; Floyd B. Harman

[57] ABSTRACT

Pressure is sensed in the multiple control valve of the IPTO assembly. By hydraulic means the pressure variations are communicated to a hydraulic piston which, via a linkage assembly, modifies the work cycle of the engine governor.

5 Claims, 2 Drawing Figures

PATENTED APR 2 1974   3,800,926
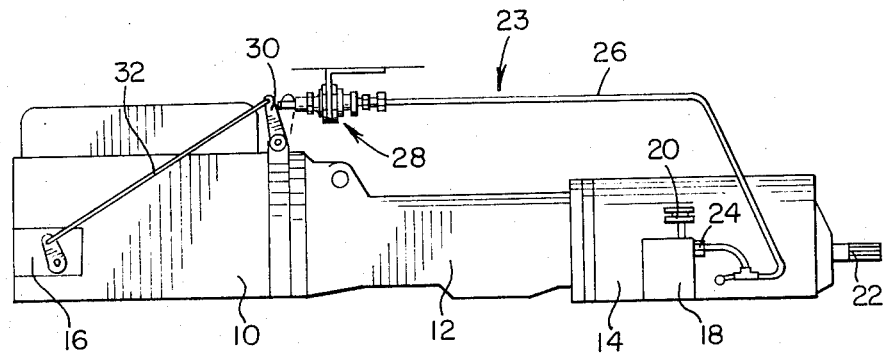
FIG_1_
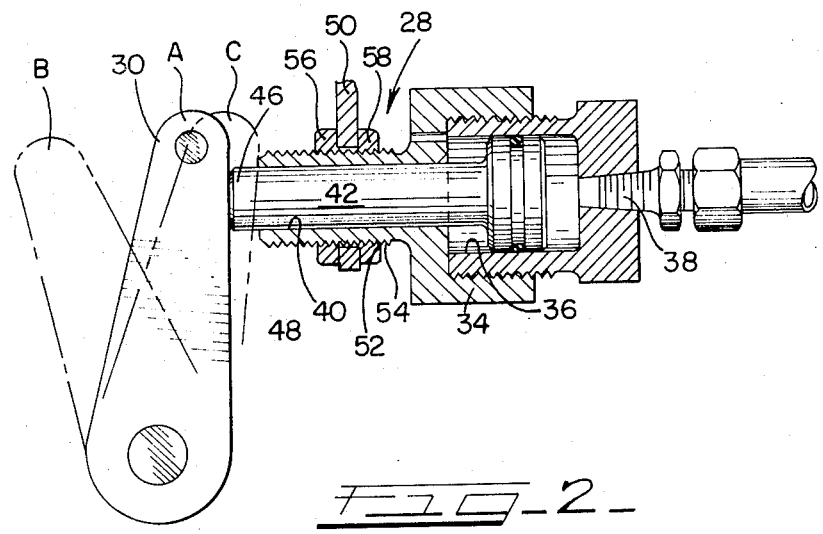
FIG_2_

IPTO SPEED LIMITING CONTROL VALVE

This invention relates to independent power take-off shafts and more particularly to a device responsive to the actuation of the IPTO shaft that in turn control the speed of the engine driving the IPTO shaft.

In the normal case where a vehicle such as a tractor is fitted with an IPTO assembly, the speed or RPM of the IPTO shaft is directly dependent upon the speed or RPM of the engine. For the most part force is transferred from the tractor engine to the IPTO assembly by a direct gear assembly. It sometimes is necessary or desirable to increase the RPM of the engine which runs the IPTO assembly as a result of increasing tractor drawbar horsepower for example. If this is done and the IPTO driving gears are not replaced to correspond to the new engine speed, the IPTO shaft would rotate at more than the standard 540 and 1000 RPM. Often these speeds exceed a safe or desirable speed of operation of the driven implement. As a result, it is desirable to govern the speed of the engine in direct response to the speed of the IPTO shaft when the latter is engaged. It is therefore an object of this invention to provide a means for association with a standard engine governor to prevent excessive IPTO shaft speeds. Yet another object of this invention is to provide a means of sensing hydraulic pressure in an IPTO shaft assembly.

Still another object of this invention is to provide an engine RPM limiting device which operates only when the IPTO assembly is actuated.

In accordance with the invention a governed engine is used to drive an IPTO assembly. The governor of the engine is made responsive to the actuation of the IPTO, that is the governor is arrested when the speed of the IPTO shaft reaches a predetermined level. A hydraulic limiting means is employed to sense pressure in the IPTO assembly and translate this pressure into force which via a mechanical linking assembly controls the degree of actuation of the engine governor.

Other objects and advantages of the invention will become apparent upon reading the following detailed description and upon reference to the drawings, in which:

FIG. 1 is an outline view of an engine, transmission housing, and IPTO assembly illustrating the relative positions thereon of the several elements employed in the practice of the present invention, and FIG. 2 is an enlarged cross-sectional view of the hydrualic cylinder means which responds to pressure in the IPTO assembly.

While the invention will be described in connection with a preferred embodiment, it will be understood that it is not intended to limit the invention to that embodiment. On the contrary, it is intended to cover all alternatives, modifications, and equivalences as may be included within the spirit and scope of the invention as defined by the appended claims.

Turning now to the drawings and more particularly to FIG. 1 wherein is shown an engine 10 mounted in a vehicle (not shown). Rearwardly of the engine means 10 is a transmission assembly 12 and rearwardly thereof an IPTO assembly means 14. Situated forwardly on the engine means 10 is an engine governor means 16. Similarly associated with IPTO assembly means 14 is a multiple control valve means 18 and IPTO control spool means 20 and an IPTO shaft means 22. All of these components are of standard construction and are familiar and well known in the industry. The engine governor means 16 for example controls the fuel injection pump when a diesel engine is used and controls the carburetor when a gas engine is employed. The multiple control valve 18 contains a power chamber actuated by lines connected with the tractors or vehicle's hydraulic system (not shown), high pressure fluid being admitted thereto for compressing the clutch plates by the manipulation of IPTO control spool means 20. The construction and function of these elements are incidental to the present invention and therefore have not been shown or discussed in great detail.

Said fluid communication with the high pressure fluid contained in multiple control valve 18 is established by port 24. By such fluid communication it is possible to sense pressure in the multiple control valve. That is upon admission of high pressure fluid to the power chambers (not shown) to force together the clutch plates (not shown) of the IPTO shaft means 22 high pressure fluid becomes available. The high pressure fluid is transferred through conduit means 26 to hydraulic cylinder sensing means 28 whereby fluid communication is established therebetween.

The engine governor means 16 is geared or otherwise suitably attached to a throttle means (not shown) located on the vehicle dash (not shown) or otherwise situated for operator convenience. That is, it is part of the linkage means whereby fuel is directed to the engine 10 whether it be diesel or gas. A linkage means 32 is provided between engine governor means 16 and governor control bell crank 30 whereby they move as a single assembly; that is, any movement of engine governor 16 is immediately transferred to governor control means 30 and visa versa. In the preferred embodiment the mechanical linkage means 32 therebetween is an elongated member of unitary construction.

In referring now to FIG. 2 wherein is more clearly shown governor control bell crank 30 and hydraulic cylinder sensing means 28. As shown therein governor control 30 in position A corresponds to an engine speed which produces an IPTO speed of 540 RPM. That is the operator has actuated the throttle member (not shown) on the dash (not shown) and moved engine governor 16 to a position such that governor control bell crank 30 assumes position A. Correspondingly phantom position B represents an engine idle position and phantom position C would if not for the invention herein disclosed correspond to a high engine speed. As will be more fully explained here after the IPTO hydraulic limiting device 23 includes the hydraulic cylinder means 28, mechanical linkage 32, control bell crank 30 and conduit means 26.

The hydraulic cylinder sensing means 28, also shown in FIG. 2, includes a housing means 34 having a bore means 36 therein. The bore means 36 has a first opening means 38 for the admission and exiting of high pressure fluid, and a second opening means 40 through which piston means 42 moves in a reciprocating manner. As is apparent, upon the actuation of the IPTO clutch (not shown) high pressure fluid is communicated for multiple control valve 18 via conduit means 26 to bore means 36 wherein a hydraulic power chamber means 44 is formed, causing the reciprocative movement of piston means 42. As is shown in FIG. 2 the extension of piston means 42 prevents the movement of governor control means 30 into phantom position C. The end means 46 thereof physically contacting the surface 48 of governor control means 30. The hydraulic cylinder means 28 is carried or otherwise supported by a bracket or support means 50 such that hydraulic cylinder means 28 can move with respect thereto in a reciprocating manner. In the preferred embodiment the surface 52 of housing 34 has a threaded means 54. A first and second jam nut means 56 and 58 are then threadedly secured on thread means 54 such that the bracket or support means 50 carries the hydraulic cylinder means. Thus, simply by moving the relative positions of the jam nut means 56 and 58 it is possible to change the relationship of the hydraulic cylinder means 28 to the bracket or support means 50.

In actual operation the RPM of the IPTO shaft means 22 are measured by any of number of suitable standard means. The engine via the throttle means (not shown) via engine governor means 16 is increased in speed until the IPTO shaft means 22 achieves a speed of 540 RPM. Under these conditions, which may vary from vehicle to vehicle, the governor control bell crank means 30 will because of mechanical linkage 32 having followed engine governor means 16 and thereby assumed a position such as A shown in FIG. 2. Under these conditions the hydraulic cylinder means 28 is positioned in its support means 50 and secured such that end 46 of piston means 42 is in close proximity or touching surface 48 of bell crank 30. After this initial setting whenever the IPTO assembly 14 is actuated piston means 42 will return to substantially the same set position. Thus, if the engine is operating at a high speed, such as corresponding to phantom position C in FIG. 2, upon engagement of the IPTO assembly 14 piston means 42 will force governor control 30 into a position corresponding to position A and consequently decrease the speed of the engine. Correspondingly if the IPTO assembly 14 is engaged when the governor control means 30 is in position B and thereafter accelerated toward a position corresponding to C, piston means 42 will arrest the engine governor 16 at an engine speed corresponding to an IPTO speed of 540 RPM. The IPTO speed limiting device means 23 will only regulate the engine governor means 16 when the IPTO shaft means is engaged; at other times, it remains out of contact therewith.

Thus it is apparent that there has been provided in accordance with the invention an IPTO speed limiting device that fully satisfies the objects, aims and advantages set forth above. While the invention has been described in conjunction with specific embodimetns thereof, it is evident that many alternatives, modifications, and variations will be apparent to those skilled in the art. in light of the foregoing description. Accordingly, it is intended to embrace all such alternatives, modifications, and variations as fall within the spirit and broad scope of the appended claims.

What is claimed is:

1. An engine means driving an IPTO assembly means which is engaged and disengaged by a multiple control valve carried thereon, a governor means on said engine made responsive to the actuation of said IPTO by a hydraulic limiting means comprising:
   a hydraulic cylinder means,
   a bell crank lever means adjacent said hydraulic cylinder means,
   a linking means fluidly communicating said control valve and said hydraulic cylinder means,
   a mechanical linkage means connecting said governor means and said bell crank lever means whereby force is transferred therebetween, such that said governor means is subject to limiting only when said IPTO is engaged.

2. The hydraulic limiting means of claim 1 wherein said hydrualic cylinder means includes a housing means having a power chamber means therein, and a support means reciprocatively carrying said housing means.

3. The hydraulic limiting means of claim 2 wherein said housing means carries a piston means reciprocatively therein, whereby said piston limits the degree of travel of said bell crank lever means.

4. The hydraulic limiting means of claim 3 wherein said multiple control valve means carries hydraulic fluid whereby the pressurization of said fluid is dependent upon actuation of said IPTO assembly.

5. An engine means driving an IPTO assembly means which is engaged and disengaged by a multiple control valve carried thereon, a governor means on said engine made responsive to actuation of said IPTO by a hydraulic limiting means comprising:
   a hydraulic cylinder means having a housing which includes a power chamber means and a piston means reciprocatively extending out therefrom,
   a linking means fluidly communicating said multiple control valve means and said power chamber whereby upon actuation of said IPTO assembly pressurized fluid flows into said power chamber, and
   a linking means responding to movement of said governor, the travel thereof being subject to control by said piston.

* * * * *